US007629900B2

(12) United States Patent
Hanahara

(10) Patent No.: US 7,629,900 B2

(45) Date of Patent: Dec. 8, 2009

(54) REMOTE CONTROL TRANSMITTER

(75) Inventor: Tetsuro Hanahara, Fukui (JP)

(73) Assignee: Panasonic Corporation, Osaka (JP)

( * ) Notice: Subject to any disclaimer, the term of this patent is extended or adjusted under 35 U.S.C. 154(b) by 427 days.

(21) Appl. No.: 11/505,705

(22) Filed: Aug. 17, 2006

(65) Prior Publication Data

US 2007/0040724 A1 Feb. 22, 2007

(30) Foreign Application Priority Data

Aug. 17, 2005 (JP) ............................ 2005-236272

(51) Int. Cl.
*H04L 17/02* (2006.01)

(52) U.S. Cl. ......................... 341/22; 341/176; 345/168; 345/169

(58) Field of Classification Search .................. 341/22, 341/176; 345/168

See application file for complete search history.

(56) References Cited

FOREIGN PATENT DOCUMENTS

JP 11-213803 8/1999

*Primary Examiner*—Brian A Zimmerman
*Assistant Examiner*—Hung Q Dang
(74) *Attorney, Agent, or Firm*—RatnerPrestia

(57) ABSTRACT

A remote control transmitter includes a case having a surface, an operation switch provided in to the case, a door capable of opening and closing the surface of the case, a detection switch provided in the case, an elastic member provided in the door, a controller for generating a signal corresponding to operations of the operation switch and the detection switch, and a transmission section for transmitting the signal. The elastic member presses the detection switch to activate the detection switch when the door closes the surface of the case. The elastic member deactivates the detection switch when the door opens the surface of the case. This remote control transmitter allows the door to be opened and closed securely, hence remotely controlling a device securely.

17 Claims, 5 Drawing Sheets

REMOTE CONTROL TRANSMITTER

FIELD OF THE INVENTION

The present invention relates to a remote control transmitter used for a remote control of various electronic devices.

BACKGROUND OF THE INVENTION

As various electronic devices for video, audio, and air-conditioning, have recently had higher functions, as remote control transmitters for remotely operating these devices can perform various operations. A remote control transmitter includes a door, and has a lot of functions by opening and closing or moving the door.

FIGS. 5A and 5B are sectional views of conventional remote control transmitter 5001. FIG. 6 is a perspective view of remote control transmitter 5001. Remote control transmitter 5001 includes case 1 having a substantially box-like shape made of insulating resin and door 6 made of insulating resin. Lower operation body 2 made of elastic material, such as rubber, has plural lower operation portions 2A. Lower operation portions 2A are coupled to each other via substantially dome-shaped thin-wall portions provided at the lower part of lower operation portions 2A and are movable in up and down directions. An upper surface of lower operation portion 2A protrudes from an upper surface of case 1. Wiring board 3 has upper and lower surfaces having wiring patterns thereon. Lower operation body 2 is mounted on the upper surface of wiring board 3. The upper surface of wiring board 3 is provided with a movable contact made of conductive material, such as carbon, formed on the lower surface of lower operation portion 2A and plural fixed contacts facing the movable contact by a predetermined gap. The movable contacts and the fixed contacts provides plural operation switches 4. Detection portion 2B is provided on the right end of lower operation body 2. Detection portion 2B is coupled to operation portion 2A which has a substantially dome-shaped thin-wall portion and which is movable in the up and down directions. A movable contact provided on a lower surface of detection portion 2B and fixed contacts provided on the upper surface of wiring board 3 provide detection switch 5. Upper operation body 7 made of elastic material, such as rubber, has plural upper operation portions 7A. Upper operation portions 7A are coupled to each other via substantially dome-shaped thin-wall portions provided at the lower portions thereof, and are movable in the up and down directions. An upper surface of upper operation portion 7A protrudes from the upper surface of door 6.

Door 6 opens and closes case 1 with hinge 8, a fulcrum, formed on a middle portion of the right end of door 6 as a fulcrum. As shown in FIG. 5B, while door 6 is closed, respective protrusions of lower surfaces of upper operation portion 7A protrude from a bottom surface of door 6, and contact the upper surface of lower operation portion 2A. While door 6 closes case 1, pressing portion 6A protruding toward the lower surface of door 6 presses detection portion 2B of lower operation body 2. Then, the thin-wall portion of the lower part of detection portion 2B bends, and entire detection portion 2B is elastically compressed in a vertical direction, thus connecting detection switch 5 electrically.

The upper and lower surfaces of wiring board 3 are provided thereon with transmission section 9 and controller 10. Transmission section 9 includes an electronic component, such as a light emitting diode, for transmitting a remote control signal. Controller 10, such as a microcomputer, is coupled via a wiring pattern to transmission section 9, operation switch 4, and detection switch 5.

Upper operation portions 7A of upper operation body 7 accommodated in door 6 are generally used as switches that are frequently used, for example, as switches for turning on and off an electronic device, volume control, or channel selection. Lower operation portions 2A of lower operation body 2 accommodated in case 1 are used as switches that are used relatively less frequently, for example, as switches for mode-switching between television and video, or for time setting.

As shown in FIG. 5B, when upper operation portion 7A protruding from the upper surface of door 6 is pressed while door 6 is closed, a thin-wall portion at the lower part of upper operation portion 7A elastically deforms, so that upper operation portion 7A moves downward and a protrusion protruding from the bottom surface of door 6 presses an upper surface of lower operation portion 2A. Then, lower operation portion 2A moves downward, so that the movable contact on this lower surface contacts the fixed contacts, thereby connecting and disconnecting operation switch 4 electrically. According to the connecting and the disconnecting, controller 10 allows transmission section 9 to transmit a remote control signal of infrared ray, thereby performing a remote operation, such as turning on and off the electronic device.

When door 6 turns with hinge 8 as a fulcrum to open as shown in FIGS. 5A and 6, pressing portion 6A protruding from the lower surface of door 6 is removed from detection portion 2B located at the right end of lower operation body 2. This allows detection portion 2B to move upward by an elastic self-restoring force of the substantially dome-shaped thin-wall portion, thereby disconnecting detection switch 5 electrically. When lower operation portion 2A protruding from the upper surface of case 1 is pressed while door 6 opens, the substantially dome-shaped thin-wall portion provided at the lower part of portion 2A elastically deforms, and allows lower operation portion 2A to move downward. Consequently, the movable contact on the lower surface of lower operation portion 2A contacts the fixed contacts, thus connecting and disconnecting operation switch 4 electrically. According to the connecting and disconnecting, controller 10 allows transmission section 9 to transmit a remote control signal. Controller 10 detects that door 6 opens based on detection switch 5. Controller 10 allows transmission section 9 to transmit a remote control signal different from that transmitted while operation portion 2A is pressed via upper operation body 7, thereby performing remote operations, such as mode switching between television and video, or time setting.

That is, controller 10 detects whether door 6 is opened or closed according to the electrically connecting and disconnecting of detection switch 5, and thereby, determines which of upper operation body 7 or lower operation body 2 is activated. According to the determination result, transmission section 9 transmits remote control signals different between the case that lower operation body 2 is directly pressed and the case that lower operation body 2 is pressed via upper operation body 7. Therefore, remote control transmitter 5001 has many remotely operating functions, thus performing more various operations.

In conventional remote control transmitter 5001, when door 6 is closed, pressing portion 6A elastically compresses entire detection portion 2B, and thereby connecting and disconnecting detection switch 5 electrically. Therefore, as shown in FIG. 6, if hinge 8 is formed not on the entire width of case 1 and door 6 but only on the middle portion of case 1, pressing portion 6A is pressed upward by an elastic self-restoring force of detection portion 2B. This pressing causes an end of door 6 to float from case 1, thus producing a gap between door 6 and the upper surface of case 1. This gap generates variation of pressing operation amount of upper operation portion 7A around the gap.

SUMMARY OF THE INVENTION

A remote control transmitter includes a case having a surface, an operation switch provided in to the case, a door capable of opening and closing the surface of the case, a detection switch provided in the case, an elastic member provided in the door, a controller for generating a signal corresponding to operations of the operation switch and the detection switch, and a transmission section for transmitting the signal. The elastic member presses the detection switch to activate the detection switch when the door closes the surface of the case. The elastic member deactivates the detection switch when the door opens the surface of the case.

This remote control transmitter allows the door to be opened and closed securely, hence remotely controlling a device reliably.

DETAIL DESCRIPTION OF THE PREFERRED EMBODIMENT

Figure 1:
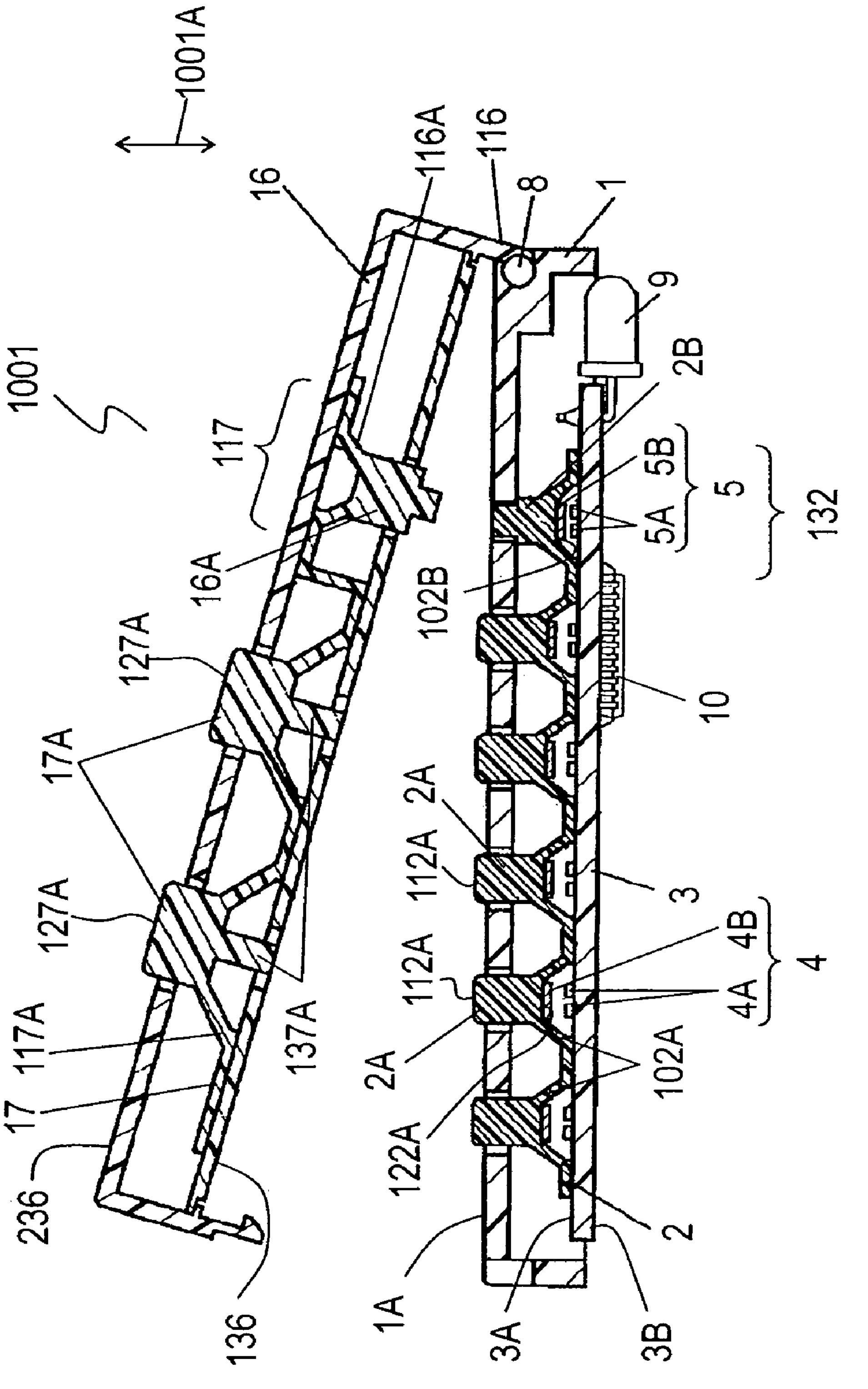
FIG. 1 is a sectional view of a remote control transmitter in accordance with an exemplary embodiment of the present invention.
Figure 2:
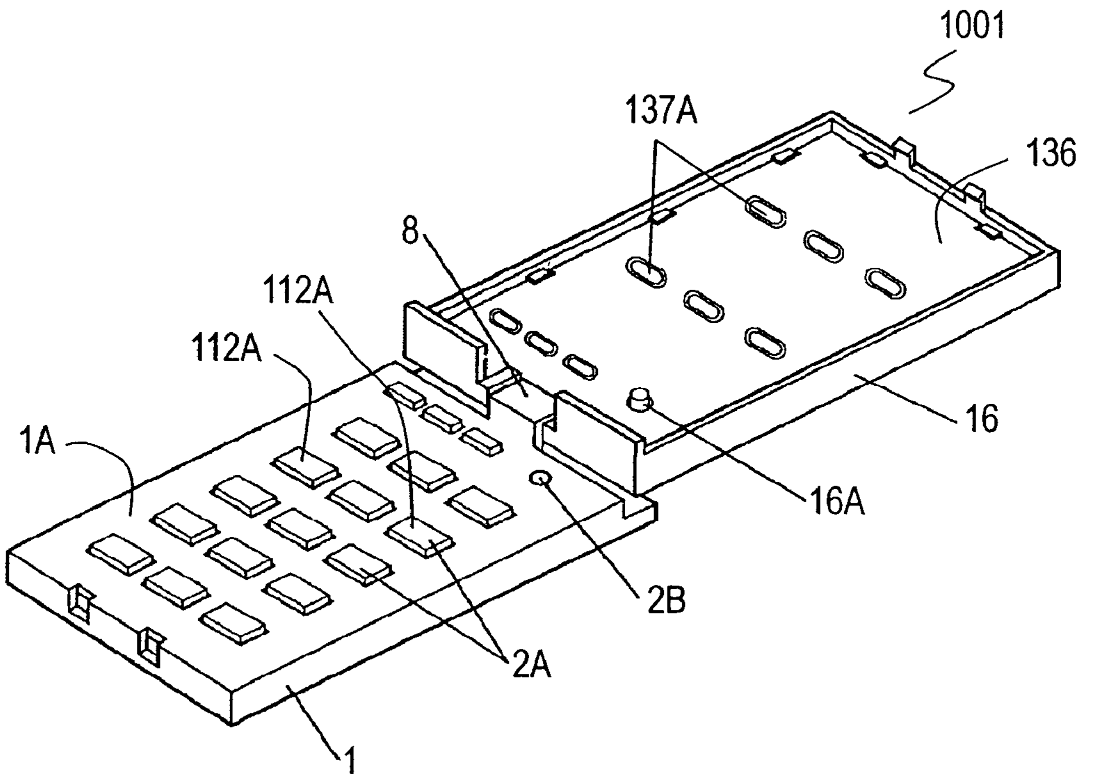
FIG. 2 is a perspective view of the remote control transmitter in accordance with the embodiment.
Figure 3:
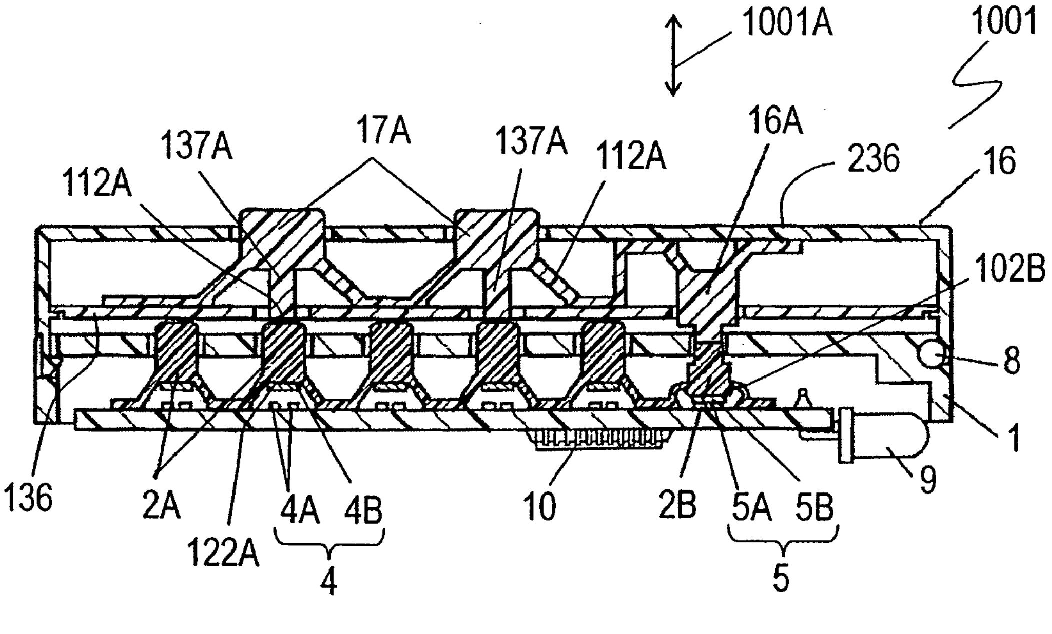
FIG. 3 is a sectional view of the remote control transmitter in accordance with the embodiment.
Figure 5A:
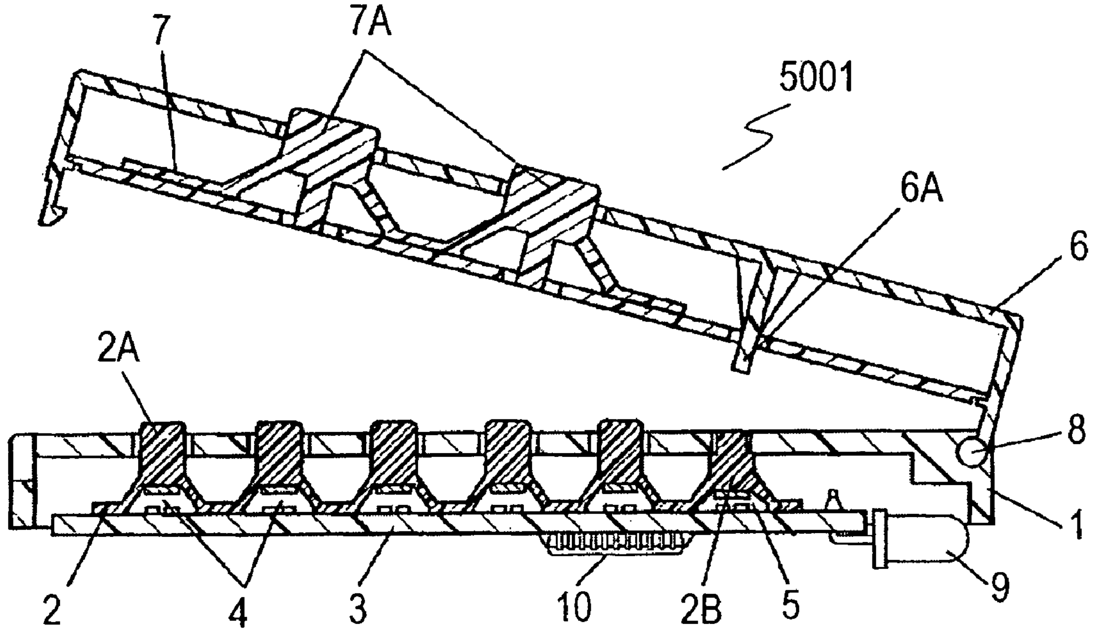
Fig. 5A PRIOR ART
FIGS. 5A and 5B are sectional views of a conventional remote control transmitter.
Figure 5B:
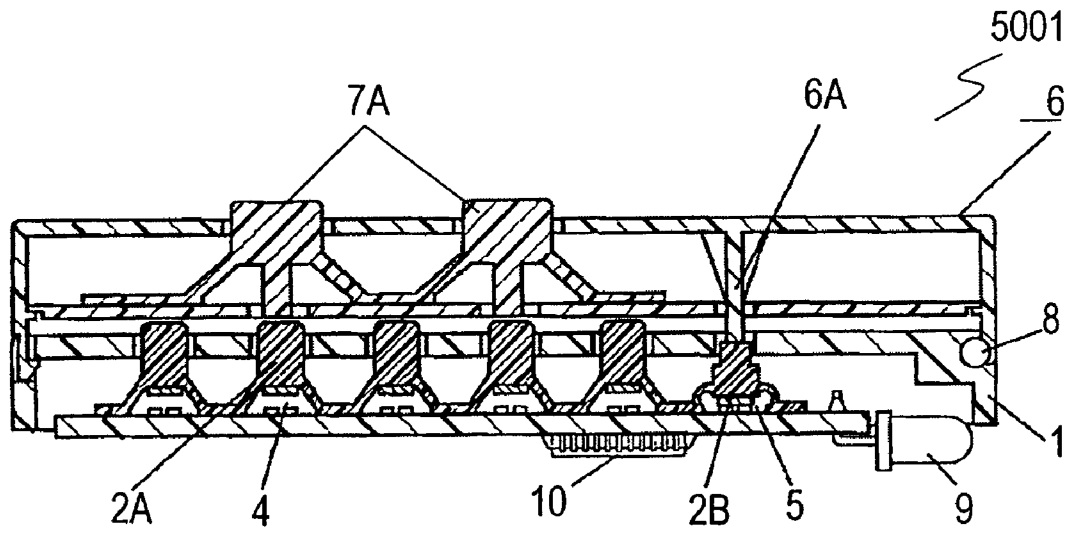
Fig. 5B PRIOR ART
Figure 6:
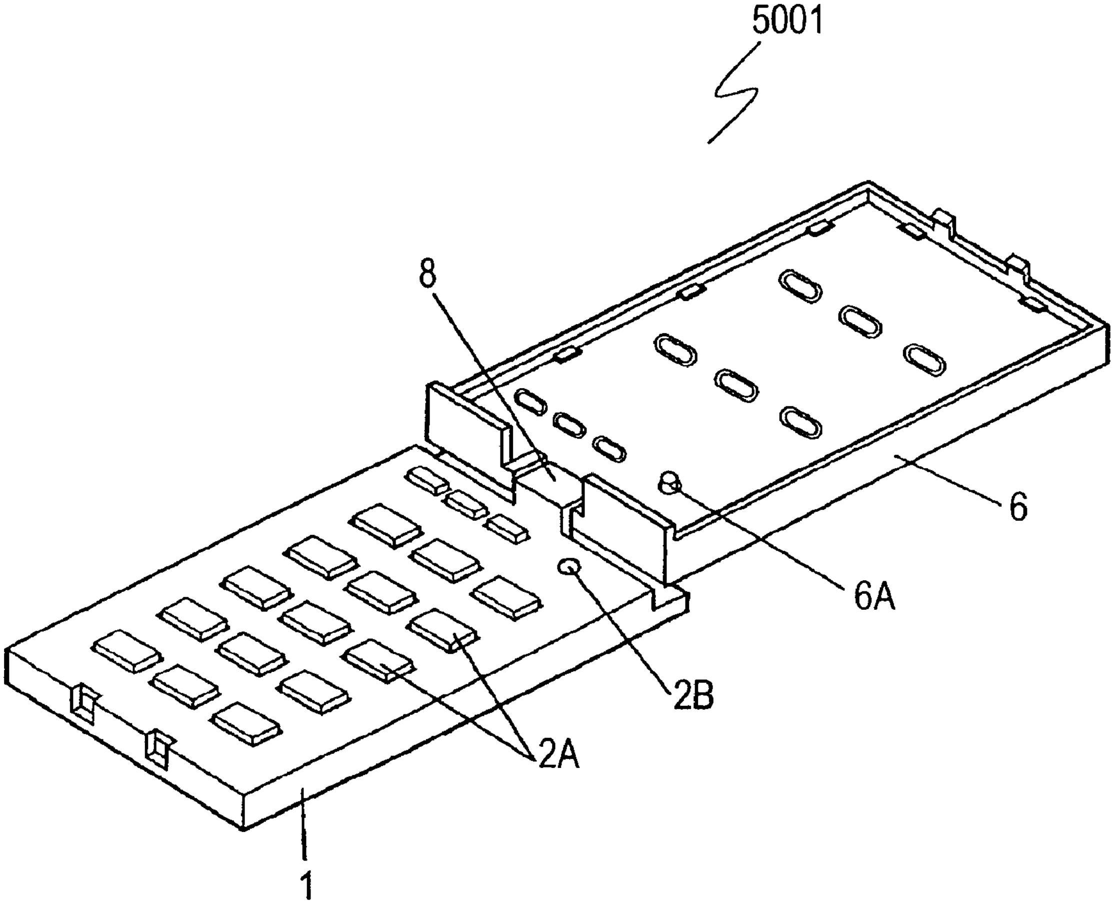
Fig. 6 PRIOR ART
FIG. 6 is a perspective view of a conventional remote control transmitter.

FIG. 1 is a sectional view of remote control transmitter 1001 in accordance with an exemplary embodiment of the present invention. FIG. 2 is a perspective view of remote control transmitter 1001. FIG. 3 is a sectional view of remote control transmitter 1001. In FIGS. 1 to 3, components identical to those of conventional remote control transmitter 5001 shown in FIGS. 5A, 5B, and 6 are denoted by the same reference numerals and their description will be simplified.

Remote control transmitter 1001 includes case 1, lower operation body 2, upper operation body 17, door 16, and wiring board 3. Case 1 has a substantially box-like shape and is made of insulating resin, such as polystyrene or ABS. Lower operation body 2 is made of elastic material, such as rubber or elastomer, and has plural lower operation portions 2A. Lower operation portions 2A have thin-wall portions 102A which have substantial dome shapes and which are provided at the lower part of portions 2A, respectively. Thin-wall portions 102A enables lower operation portions 2A to move in up and down directions 1001A. Lower operation portions 2A are coupled to each other via thin-wall portions 102A. Upper surface 112A of lower operation portion 2A protrudes from upper surface 1A of case 1.

Wiring board 3 is made of insulating material, such as paper phenol or glass epoxy. Wiring patterns made of conductive material, such as copper foil, are formed on upper surface 3A and lower surface 3B of wiring board 3. Lower operation body 2 is mounted on upper surface 3A of wiring board 3. Fixed contacts 4A and 5A are provided on upper surface 3A. Movable contact 4B made of conductive material, such as carbon, is formed on lower surface 122A of lower operation portion 2A. Movable contact 4B faces fixed contacts 4A by a predetermined gap. Movable contact 4B and fixed contacts 4A provide operation switch 4. Operation switch 4 is activated via upper surface 1A of case 1.

Operation body 2 has detection portion 2B at end 132 of body 2. Detection portion 2B has thin-wall portion 102B which has a substantially dome shape and which is provided at the lower part of detection portion 2B. Detection portion 2B is coupled to thin-wall portion 102A of lower operation body 2A. Thin-wall portion 102B enables detection portion 2B to move in up and down directions 1001A. Movable contact 5B made of conductive material, such as carbon, is formed on lower surface 122B of detection portion 2B, and faces fixed contacts 5A by a predetermined gap. Movable contact 5B and fixed contacts 5A provide detection switch 5. Detection portion 2B provides detection switch 5 with an elastic self-restoring force, and allows detection switch 5 to be deactivated by the restoring force while detection portion 2B is not pressed. Detection switch 5 is activated via lower surface 136 of door 16.

Door 16 is made of insulating resin. Upper operation body 17 is made of elastic material, such as rubber or elastomer. Door 16 is coupled to case 1 with hinge 8 provided at end 116 as a fulcrum which arranges door 16 to open and close surface 1A of case 1. Upper operation body 17 has plural upper operation portions 17A. Upper operation portions 17A have thin-wall portions 117A which have substantially dome shapes and are provided at the lower part of upper operation body 17, respectively. Thin-wall portions 117A are coupled to each other, and enable operation portions 17A to move in up and down direction 1001A. Upper surface 127A of upper operation portion 17A protrudes from upper surface 236 of door 16. Upper operation body 17A has protrusion 137A protruding from lower surface 136 of door 6. Door 16 opens and closes upper surface 1A of case 1.

Elastic member 16A is provided on end 117 of upper operation body 17 and formed unitarily with upper operation portions 17A. Elastic member 16A has thin-wall portion 116A having a substantially dome shape at the upper part of elastic member. Thin-wall portion 116A is coupled to thin-wall portion 117A of upper operation portion 17A, and enables elastic member 16A to move in up and down direction 1001A. Elastic member 16A protrudes from lower surface 136 of door 16 opposite to upper surface 236 of door 16.

As shown in FIG. 3, while door 16 closes upper surface 1A, protrusion 137A of upper operation portion 17A protruding from lower surface 136 of door 16 contacts upper surface 112A of lower operation portion 2A. Elastic member 16A protruding from lower surface 136 of door 16 presses detection portion 2B provided at end 132 of lower operation body 2, so that thin-wall portion 102B elastically deforms, and detection portion 2B moves downward. Then, movable contact 5B contacts fixed contacts 5A, thus connecting detection switch 5 electrically to activate switch 5. As shown in FIG. 1, while door 16 opens upper surface 1A, elastic member 16A deactivates detection switch 5.

A force capable of causing elastic member 16A to deform elastically is determined to be about twice larger than a force capable of causing detection portion 2B to deform elastically. When door 16 is closed, thin-wall portion 102B provided at the lower part of detection portion 2B is firstly pressed by elastic member 16A and elastically deforms, accordingly causing detection portion 2B to move downward and connecting detection switch 5 electrically. Then, thin-wall portion 116A provided at the upper part of elastic member 16A bends, accordingly maintaining the electric connection of detection switch 5.

While door 16 is closed, thin-wall portion 116A of elastic member 16A contacting detection portion 2B elastically deforms, accordingly absorbing the elastic self-restoring force of detection portion 2B directed upward. Therefore, a force causing door 16 to float due to this elastic self-restoring force is not produced, then producing no gap between door 16 and upper surface 1A of case 1.

Upper surface 3A and lower surface 3B of wiring board 3 are provided thereon with transmission section 9 and controller 10, such as a microcomputer. Transmission section 9 includes an electronic component, such as a light emitting diode, for transmit a remote control signal. Controller 10 is coupled via the wiring pattern to transmission section 9, operation switch 4, and detection switch 5.

Upper operation portions 17A of upper operation body 17 accommodated in door 16 are generally used as switches that are frequently used, for example, as switches for turning on and off an electronic device, volume control, or tuning of the electronic device. Lower operation portions 2A of lower operation body 2 in case 1 are used as switches that are used relatively less frequently, for example, as switches for mode switching between television and video, or for time setting.

As shown in FIG. 3, when upper operation portion 17A protruding from upper surface 236 of door 16 is pressed while door 6 is closed, thin-wall portion 117A having a substantially dome shape deforms elastically, thus having upper operation portion 17A move downward. Protrusion 137A protruding from lower surface 136 of door 16 accordingly presses upper surface 112A of lower operation portion 2A. Then, lower operation portion 2A moves downward, so that movable contact 4B contacts fixed contacts 4A, thus connecting operation switch 4 electrically. Controller 10 generates a remote control signal according to operations of operation switch 4 and detection switch 5. While door 16 is closed, detection switch 5 is activated and connected electrically. Then, operation switch 4 is connected electrically. Accordingly, controller 10 generates a remote control signal and allows transmission section 9 to transmit the signal as infrared ray to the electronic device, then performing a remote operation, such as turning on and off the electronic device.

When door 16 turns with hinge 8 as a fulcrum to open door 16, as shown in FIGS. 1 and 2, elastic member 16A protruding from lower surface 136 of door 16 is removed from detection portion 2B of lower operation body 2. Detection portion 2B accordingly moves upward by the elastic self-restoring force of thin-wall portion 102B having a substantially dome shape, thereby deactivating and disconnecting detection switch 5 electrically.

When lower operation portion 2A protruding from upper surface 1A of case 1 is pressed while door 16 opens, thin-wall portion 102A elastically deforms, accordingly causing lower operation portion 2A to move downward. Consequently, movable contact 4B provided on lower surface 122A contacts fixed contacts 4A, thus activating and connecting operation switch 4 electrically.

While door 16 is opened, detection switch 5 is electrically disconnected, and operation switch 4 is electrically connected. Controller 10 accordingly allows transmission section 9 to transmit a remote control signal. At this moment, controller 10 detects that door 16 opens based on detection switch 5, and allows transmission section 9 to transmit, to the electronic device, a remote control signal that is different from the signal transmitted when operation body 2 is pressed via upper operation body 7, thereby performing a remote operation, such as mode switching between television and video, or time setting.

That is, controller 10 detects the opening and closing status of door 16 based on the electric connection and disconnection, i.e., e activating and deactivating, of detection switch 5 and determines which of upper operation body 17 or lower operation body 2 is activated. Controller 10 allows transmission section 9 to transmit a remote control signal that is different between the case that lower operation body 2 is pressed directly and the case that lower operation body 2 is pressed via upper operation body 7. Thus, remote control transmitter 1001 has a lot of remote operation functions and performs various operations.

While door 16 is closed, thin-wall portion 116A provided at the upper part of elastic member 16A absorbs an upward-urging force of detection portion 2B produced by its elastic deformation. This cancels a force causing door 16 to float, thus preventing a gap from being produced between door 16 and upper surface 1A of case 1. Therefore, remote control transmitter 1001 allows upper operation portions 17A to be pressed uniformly, thus remotely controlling the electronic device reliably.

Figure 4A:
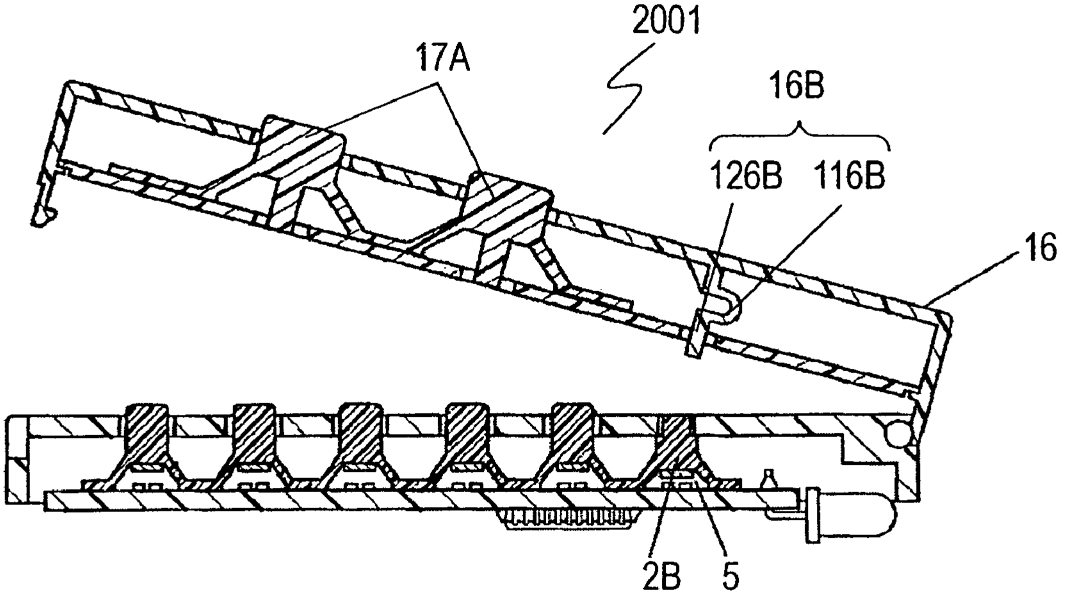
FIGS. 4A and 4B are sectional views of another remote control transmitter in accordance with the embodiment.
Figure 4B:
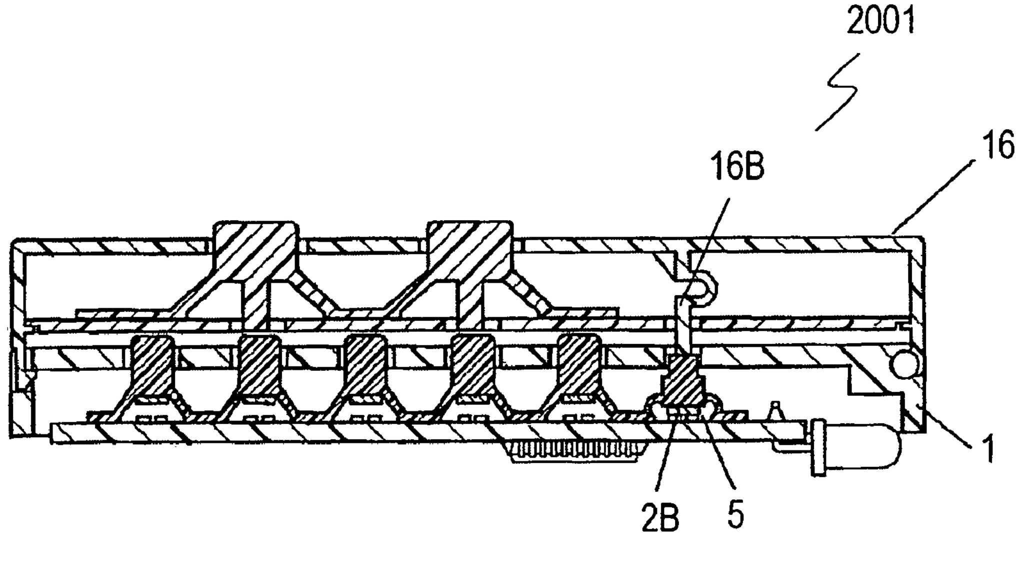

FIGS. 4A and 4B are sectional views of another remote control transmitter 2001 in accordance with the embodiment. In FIGS. 4A and 4B, components identical to those of remote control transmitter 1001 shown in FIGS. 1 to 3 are denoted by the same reference numerals, and their description will be omitted. Remote control transmitter 2001 includes elastic member 16B instead of elastic member 16A of remote control transmitter 1001. Elastic member 16B includes rigid portion 126B protruding from lower surface 136 of door 16, and elastic portion 116B having a U-shape provided at a middle portion of elastic member 16B. When door 16 is closed, elastic member 16B protruding from lower surface 136 of door 16 contacts detection portion 2B, thereby causing elastic portion 116B to elastically deform.

A force capable of causing elastic member 16B (elastic portion 116B) to elastically deform is determined to be larger, about twice larger than a force capable of causing detection portion 2B to elastically deform, i.e., a force capable of activating detection switch 5. When door 16 is closed, thin-wall portion 102B provided at the lower part of detection portion 2B is pressed by elastic member 16B and firstly deforms elastically, so that detection portion 2B moves downward, accordingly activating and connecting detection switch 5 electrically. Then, elastic portion 116B of elastic member 16B is bent, maintaining the electric connection, i.e., the activating, of detection switch 5.

In remote control transmitters 1001 and 2001 in accordance with the embodiment, detection portion 2B is provided at end 132 of lower operation body 2 unitarily with lower operation portions 2A, and connecting and disconnecting detection switch 5 electrically. Detection portion 2B may be a independent switch of pressing or swing operation type provided on upper surface 3A of wiring board 3. Elastic members 16A and 16B activate this switch.

The remote control transmitter in accordance with the embodiment may not necessarily include upper operation body 17. In this remote control transmitter, door 16 is opened and closed to pressing only lower operation body 2.

The remote control transmitter in accordance with the embodiment may include a movable contact made of metal thin plate having a substantially dome shape provided over fixed contacts 1B on upper surface 3A of wiring board 3 instead of operation switch 4 including movable contact 4B on lower surface 122A of lower operation body 2 and fixed contacts 4A on upper surface 3A of wiring board 3. The remote control transmitter in accordance with the embodiment may include various switches, such as plural independent push switches provided on wiring board 3 instead of operation switch 4.

The remote control transmitter in accordance with the embodiment has a simple structure allowing door 16 to be opened and closed securely, and remotely controls a device reliably.

What is claimed is:

1. A remote control transmitter comprising:

a case having a surface;

an operation switch provided in the case;

a door arranged to open and close the surface of the case;

a detection switch provided in the case, the detection switch being activated upon being pressed and configured to deform while the door closes the surface of the case and provide a self-restoring force for deactivating the detection switch;

an elastic member movable together with the door, the elastic member configured for (i) pressing the detection switch to deform and activate the detection switch and (ii) elastically deforming away from the detection switch to absorb a portion of the self-restoring force for deactivating the detection switch while the door closes the surface of the case, and deactivating the detection switch while the door opens the surface of the case;

a controller for generating a signal corresponding to operations of the operation switch and the detection switch; and a transmission section for transmitting the signal.

2. The remote control transmitter of claim 1, wherein the elastic member and the detection switch are each configured so that a first force which causes the elastic member to elastically deform is larger than a second force which causes the detection switch to deform.

3. The remote control transmitter of claim 1, further comprising an operation body operable via the surface of the case, wherein the operation switch is activated by an operation of the operation body.

4. The remote control transmitter of claim 1, further comprising first operation body for activating the operation switch while the door closes the surface of the case.

5. The remote control transmitter of claim 1, wherein the elastic member includes a rigid portion for contacting the detection switch and an elastic portion extending from the rigid portion.

6. The remote control transmitter of claim 1, wherein the elastic portion is U-shaped.

7. The remote control transmitter of claim 1, wherein the elastic member is provided at the door.

8. The remote control transmitter of claim 4, wherein the door has a first surface and a second surface opposite to the first surface of the door, the first surface of the door facing the surface of the case while the door closes the surface of the case, the first operation body is provided at the door and has an operation portion operable from the second surface of the door, and the first operation body activates the operation switch upon the operation portion being depressed while the door closes the surface of the case.

9. The remote control transmitter of claim 8, wherein the elastic member is formed unitarily with the first operation body.

10. The remote control transmitter of claim 8, further comprising a second operation body operable via the surface of the case, wherein the operation switch is activated by an operation of the second operation body.

11. The remote control transmitter of claim 1, wherein the first operation body depresses the second operation body upon the operation portion being depressed so as to activate the operation switch while the door closes the surface of the case.

12. The remote control transmitter of claim 4, wherein the elastic member and the detection switch are each configured so that a first force which causes the elastic member to deform is larger than a second force which causes the detection switch to deform.

13. The remote control transmitter of claim 4, wherein the elastic member is formed unitarily with the first operation body.

14. A remote control transmitter comprising:

a case having a surface;

an operation switch provided in the case;

a door arranged to open and close the surface of the case;

a detection switch provided in the case, the detection switch being activated upon being pressed and configured to deform while the door closes the surface of the case and provide a self-restoring force for deactivating the detection switch;

an elastic member provided at the door, the elastic member comprising a deformable member and configured for (i) pressing the detection switch to deform and activate the detection switch and (ii) absorbing a portion of the self-restoring force for deactivating the detection switch while the door closes the surface of the case, and deactivating the detection switch while the door opens the surface of the case;

a controller for generating a signal corresponding to operations of the operation switch and the detection switch; and a transmission section for transmitting the signal, wherein the elastic member includes a rigid portion for contacting the detection switch and the deformable member extends from the rigid portion, and the deformable member is U-shaped.

15. The remote control transmitter of claim 14, wherein the elastic member and the detection switch are each configured so that a first force which causes the elastic member to deform is larger than a second force which causes the detection switch to deform.

16. The remote control transmitter of claim 14, further comprising an operation body operable via the surface of the case, wherein the operation switch is activated by an operation of the operation body.

17. The remote control transmitter of claim 14, further comprising an operation body for activating the operation switch while the door closes the surface of the case.

* * * * *